United States Patent [19]

Kashio

[11] 4,310,861
[45] Jan. 12, 1982

[54] DATA-RECORDING DEVICE

[75] Inventor: Toshio Kashio, Tokyo, Japan

[73] Assignee: Casio Computer Co., Ltd., Tokyo, Japan

[21] Appl. No.: 71,859

[22] Filed: Sep. 4, 1979

Related U.S. Application Data

[63] Continuation of Ser. No. 920,719, Jun. 30, 1978, which is a continuation of Ser. No. 712,532, Aug. 9, 1976, abandoned.

[30] Foreign Application Priority Data

Aug. 11, 1975 [JP] Japan .............................. 50-97348/75
Dec. 26, 1975 [JP] Japan .................................. 50-158628

[51] Int. Cl.³ ................................................ G11B 5/09
[52] U.S. Cl. ........................................... 360/50; 360/78
[58] Field of Search ....................... 360/48, 53, 78, 61, 360/50

[56] References Cited

U.S. PATENT DOCUMENTS

3,212,074 10/1965 Daniels et al. .......................... 360/78
3,495,047 2/1970 Arsumi et al. ........................ 360/108
3,761,903 9/1973 Burro, Jr. et al. ..................... 360/53
3,787,815 1/1974 Farr, Jr. ................................ 360/48

Primary Examiner—Vincent P. Canney
Attorney, Agent, or Firm—Frishauf, Holtz, Goodman and Woodward

[57] ABSTRACT

A data-recording device wherein a plurality of tracks are concentrically provided on the recording surface of a rotatable magnetic recording medium. A plurality of sector-starting positions are arranged on the respective tracks at a given circumferential interval to detect the extent to which the magnetic recording medium has been rotated, and one sector-starting position among the sector-starting positions of the respective tracks is used as a point at which the writing or reading of data is to be commenced. A circumferential angular interval between a sector-starting position provided on a given track to be used as a data write-read starting point and a similar sector-starting position provided on a track adjacent to said given track to be used as a data write-read starting point is so defined as to give a magnetic head a sufficient length of time to be shifted from said given track to the adjacent track in the time of rotating of a magnetic recording medium being rotated through the above-mentioned circumferential angular interval.

1 Claim, 11 Drawing Figures

| TRACK NUMBER | TRACK DESIGNATION CODE | | | | | | | | | SECTOR | SECTOR-SPECIFYING CODE |
|---|---|---|---|---|---|---|---|---|---|---|---|
| | | | | | | SECTOR CHECK CODE | | | | | |
| 1T | 0 | 0 | 0 | 0 | 0 | 0 | 0 | 0 | 0 | 1S | 0 0 0 0 0 |
| 2T | 0 | 0 | 0 | 0 | 0 | 0 | 0 | 0 | 1 | 3S | 0 0 0 1 0 |
| 3T | 0 | 0 | 0 | 0 | 0 | 0 | 0 | 1 | 0 | 5S | 0 0 1 0 0 |
| 4T | 0 | 0 | 0 | 0 | 0 | 0 | 0 | 1 | 1 | 7S | 0 0 1 1 0 |
| 16T | 0 | 0 | 0 | 0 | 0 | 1 | 1 | 1 | 1 | 31S | 1 1 1 1 0 |
| 17T | 0 | 0 | 0 | 0 | 1 | 0 | 0 | 0 | 0 | 1S | 0 0 0 0 0 |
| 18T | 0 | 0 | 0 | 0 | 1 | 0 | 0 | 0 | 1 | 3S | 0 0 0 1 0 |
| 200T | 0 | 1 | 1 | 0 | 0 | 0 | 1 | 1 | 1 | 15S | 0 1 1 1 0 |

DATA-RECORDING DEVICE

This is a continuation of application Ser. No. 920,719 filed June 30, 1978, which is a continuation of Ser. No. 712,532 filed Aug. 9, 1976, now abandoned.

This invention relates to a data-recording device for writing a data into a rotatable magnetic recording medium, such as a magnetic disc, magnetic drum etc., and reading it from the recording medium.

A plurality of tracks are concentrically provided on a recording medium such as a magnetic disc etc., and data is written onto each track on the recording medium. An index is given to a particular position on each track of the recording medium and the index point constitutes data write/read starting and ending positions. In this case, a magnetic head is shifted, by a track designation information etc., to a desired position on the track of the recording medium and when the index point of any designated track of the rotating recording medium confronts the magnetic head a write-in or readout operation is started at the index point of the designated track of the recording medium. Suppose now that after the readout of a data on a first track, data on a second track is sequentially read out. When in this case the data readout is effected up to the index point on the first track, a seek instruction for shifting the magnetic head to the second track is issued to the magnetic head so as to shift the magnetic head from the first track to the second track. Since, however, some time is required for the magnetic head to be shifted from the first track to the second track, when the magnetic head is in a condition in which it can read out the data on the second track, there sometimes occurs the cases where the index point the second track of the rotating magnetic medium has already passed the located position of the magnetic head and the readout operation must be written until the index point on the second track is agained moved to the position where the magnetic head is located. That is, when the magnetic head is shifted from one track to another, a wait time is required for the index point on the another track to be rotated to the position where the magnetic head is positioned. This provides a bar to the continuous write-in and readout of data over a plurality of tracks. Furthermore, when, for example, a check data is recorded on the head of a data and any desired data is sought by the check data, it is required that the check data readout and the shift of the magnetic head from one track to another be continuously effected until the desired data is detected. In this case, the situation is aggravated and it is therefore difficult to seek the desired data by the check data.

It is accordingly the object of this invention to provide a data-recording device which permits a magnetic head to be continuously scanned over a plurality of tracks without substantially involving any dwell time and which is capable of effectively seeking any desired data by a check data so as to effectively effect a data processing control.

SUMMARY OF THE INVENTION

According to this invention there is provided a data-recording device including a rotatable magnetic recording medium having a plurality of concentric tracks, each track having an index point for detecting the rotation position of the recording medium, and a magnetic head mounted so as to confront the recording surface of the magnetic recording medium and adapted to be sequentially shifted to any desired track on the recording medium so as to permit a data to be written into, and read out of, the desired track on the recording medium. A data read/write track starting point is predetermined for each track and there is provided a control circuit means for permitting a time required for the recording head on any track to be shifted to at least another adjacent track to be set to coincide with a time required for said another track point to be moved to a position where it confronts the recording head. The control circuit means is such that during the time period in which the recording head is shifted from any track to at least another adjacent track the recording medium continues to be rotated and even when the track point on any track of the rotating medium is excessively moved, the recording head can be shifted to a position where it meets the track point on the adjacent track of the rotating recording medium. It is therefore possible to provide a data-recording device capable of effecting a continuous data write-in and readout operation without requiring any additional rotation of the recording medium.

BRIEF DESCRIPTION OF THE DRAWINGS

FIGS. 10A to 10I shows signal waveform diagram for explaining the operation of an embodiment in FIG. 9.

DETAILED DESCRIPTION

There will now be described by reference to the appended drawings a data-recording device according to an embodiment of this invention.

Figure 1:
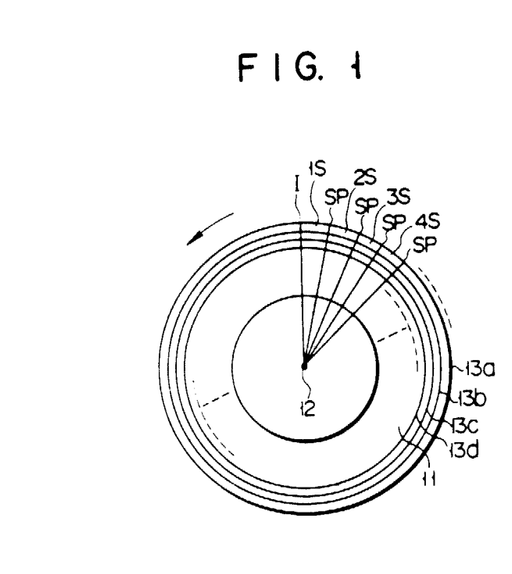
FIG. 1 is a plan view schematically showing one form of a magnetic recording medium.

FIG. 1 shows a disk 11 used as a rotatable magnetic recording medium. The disk 11 has a plurality of circular tracks 13a, 13b, 13c 13d ... concentrically arranged about the rotating shaft 12. These tracks 13a, 13b, 13c, 13d ... are generally provided in a number of 406. The respective tracks of the disk 11 have an index I formed by, for example, drilling so as to indicate a base by which a specified rotation angle is defined optically, magnetically or mechanically. With the position of the index I taken as a base, the respective tracks of the disk 11 are separated into a plurality of equal divisions or sectors at a prescribed circumferential angular interval. Like the index I, a plurality of sector-starting positions SP are provided. The spaces or sectors between every adjacent sector-starting positions SP are designated as 1S, 2S, 3S, 4S . . . as shown in FIG. 1. Generally, each track has 32 sectors and in consequence 31 sector-staring positions. Writing and reading of data is effected through a magnetic head (not shown) by rotating the disk 11 in the direction of an arrow indicated in FIG. 1. With the first track 13a, the position of the index I is taken as a point at which recording of data is to be started and terminated. Now let it be assumed that the disk 11 makes a rotation through a circumferential angular interval corresponding to one sector while the magnetic head is shifted from the first track 13a to the second track 13b and further keeps on rotating. Then a track starting position immediately following the Index I is taken as the point at which recording of data in the second track 13b is to be commenced. Where the magnetic head is operated until the index I taken as the terminal point of recording in the first track 13a and the magnetic head is immediately shifted to the second track 13b, then data is written in or readout of the second track 13b without any waste of time after data is fully written in or read-out of the first track 13a. Thus throughout the tracks, writing or reading can be carried out continuously.

Figure 2:
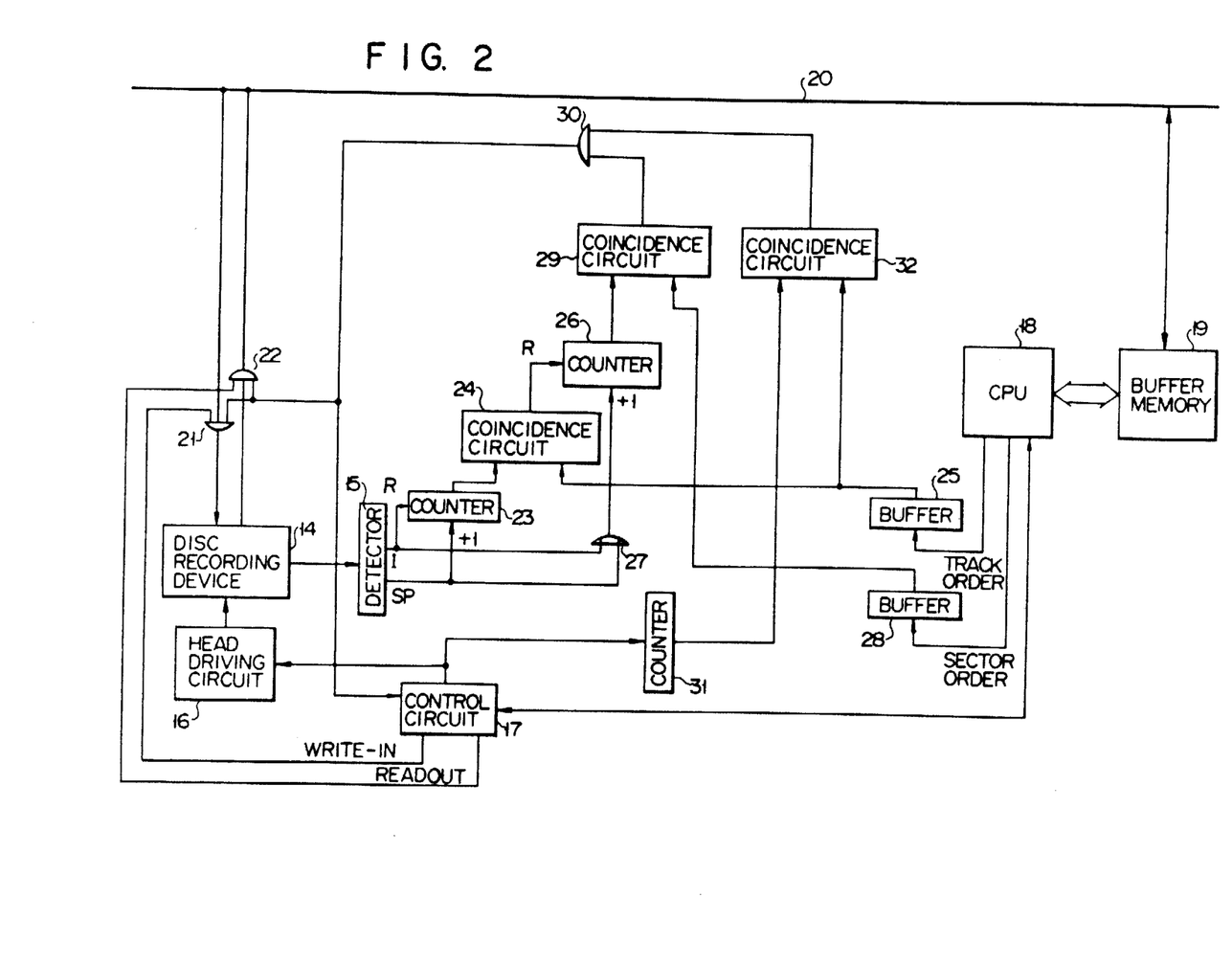
FIG. 2 is a block circuit diagram according to one embodiment of this invention which controls a data write-in and readout operation.

FIG. 2 is a block circuit diagram of a device, where data is written in or read out of the disk 11. With a disk recording device 14 including the magnetic head (not shown), signals showing the detection of the index I and a sector-starting position SP are read out of a detector 15. The magnetic head is operated by a magnetic head driving mechanism 16 so as to be selectively shifted from one track to another. The magnetic head-driving mechanism 16 is controlled by an instruction issued from a control circuit 17. Upon receipt of an instruction from a central processing unit (abbreviated as "CPU") 18, the control circuit 17 sends forth an instruction to change tracks and commence writing and reading.

A buffer memory 19 is provided for the CPU. Data read out of the buffer memory 19 is supplied to the disk recording device 14 through a data bus 20 and AND circuit 21. Data read out of the disk recording device 14 is stored in the buffer memory 19 through the data bus 20. A write instruction from the control circuit 17 is conducted as a gate signal to the AND circuit 21, and a read instruction from the control circuit 17 is supplied similarly as a gate signal to another AND circuit 22.

Figure 3:
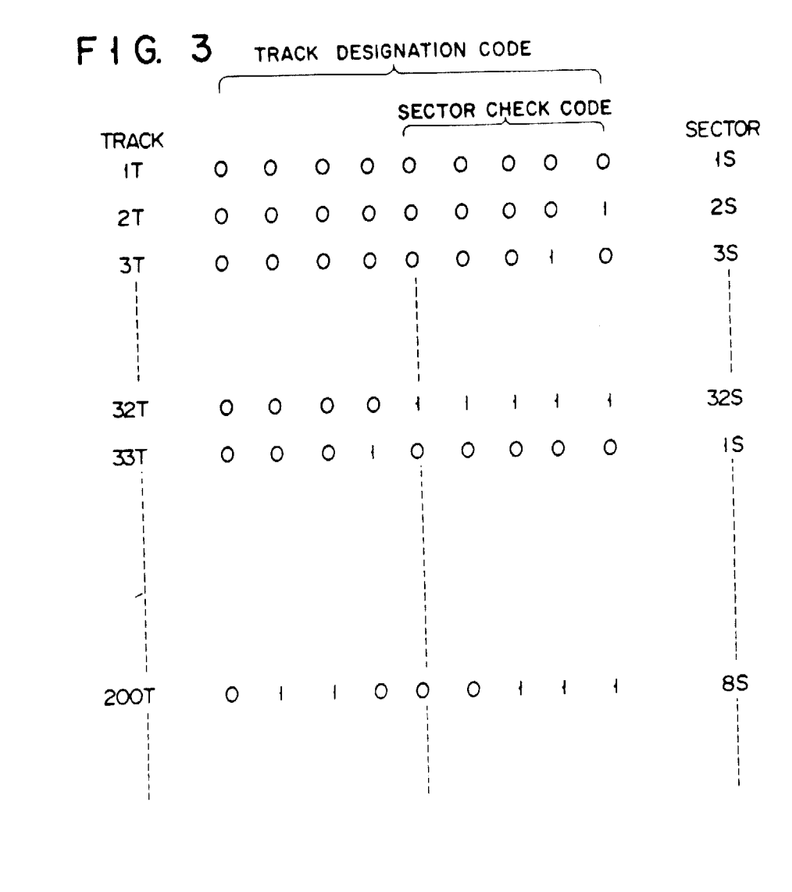
FIG. 3 shows a relative relation between a track designation code configuration and section check code configuration as used in the block circuit diagram.

A signal showing the detection of the index I which is sent forth from the detector 15 is transmitted as a reset instruction to a first counter 23. This counter 23 is advanced in counting upon receipt of a signal showing the detection of a sector-starting position SP which is read out of the detector 15. The first counter 23 is so designed as to make a count corresponding to the sequential order of a given sector of the specified track scanned by the magnetic head. A count made by the first counter 23 is transmitted to a first coincidence circuit 24. An output from a first buffer memory 25 stored with an instruction for designating a track in which data from the CPU 18 is to be written or an instruction for specifying a track out of which stored data is to be read is supplied to the first coincidence circuit 24 as a data to be compared with a count made by the first counter 23. When coincidence takes place between the output from the first buffer memory 25 and the count made by the first counter 23, then the first coincidence circuit 24 produces a coincidence signal.

Where the disk 11 is assumed to have 406 tracks as previously mentioned, than a track-specifying instruction is formed of nine bits. Where each track is supposed to have thirty-two sectors, then a signal SP denoting a sector order number from the Index is formed of five bits. The first counter 23 produces a count of 5 bits to be compared with the 5-bit portion of the above-mentioned 9-bit data in the coincidence detector 24. In FIG. 3 the sequential positions 1T, 2T, 3T . . . occupied by the respective tracks are represented by 9-bit coded datas given opposite thereto. With the above-mentioned disk recorder 11, a track starting position is shifted by one sector, that is, one circumferential angular interval to record data, each time one track is changed to the immediately following one. The track starting position of, for example, the first track 1T is sector 1S represented by a five-bit code of (00000). The track starting position of said track 1T is 2S represented by a five-bit code of (00001). Similarly, the track starting position of said track 3T is denoted as 3S. As is apparent from FIG. 3, a look at the last five bits of nine bits constituting a track-specifying data indicates the above-mentioned starting position of the respective tracks. For example, where the second track 2T is specified and coincidence takes place between a count of (00001) of the detected sector starting position SP made by the first counter 23 and the last five bits of (00001) of the 9-bit code specifying said second track 2T, then the starting position of the first read-write of the second track 2T is determined.

Referring to FIG. 2, where the coincidence detector 24 issues a signal showing coincidence between a count made by the first counter 23 to indicate the sector-starting position of the first read-write of a specified track and the last five bits of a 9-bit code denoting said specified track which is stored in the first buffer memory 25, then the magnetic head attached to the disk recoder 11 is brought exactly to a position in which the first read-write of said specified track is commenced. The above-mentioned coincidence signal is supplied as a reset signal to the second counter 26. Signals showing the detection of the index I and the specified sector position SP which have been delivered from the detector 15 are supplied as count-advancing signals to the second counter 26 through an OR circuit 27. Thus, the second counter 26 makes a count corresponding to an amount of rotation angle of the disk recorder 11 as measured from the starting position of the first read-write of a specified track. A count made by the second counter 26 is compared in a second coincidence detector 29 with a data on the sequential order of a sector specified for read-write operation which has been supplied from the CPU 18. Where coincidence takes place between the above-mentioned count and data, then signal denoting said coincidence is supplied to an AND circuit 30.

An instruction to seek the magnetic head which has been given by the control circuit 17 is conducted to a counter 31 for counting the sequential order of a specified track. Upon receipt of the instruction to seek the magnetic head, the counter 31 counts the sequential order of a track on which the magnetic head lies. A count denoting the sequential order of said track which has been made by the counter 31 is compared in a third coincidence detector 32 with a data stored in the first buffer memory 25 which shows the sequential order of said track. Where coincidence arises between the track specified by the CPU 18 and the track on which the magnetic head is disposed, then the coincidence detector 32 produces a signal denoting said coincidence. This coincidence signal is supplied as a gating instruction to the AND circuit 30. An output from the AND circuit 30 is sent forth as a gate signal to the AND circuits 21, 22 and also as an instruction to commence reading or writing of data to the control circuit 17. This control circuit 17 supplies the CPU 18 with an instruction to commence reading or writing of data in accordance with the following program.

Where, with a data-recording device arranged as described above, data transferred through the data bus 20 is written in the disk recorder 14, then the CPU 18 supplies said disk recorder 14 with signals denoting the sequential order of a specified track of the disk recorder 14 and also the sequential order of a sector of said track in which writing is to be started. These two signals are stored in the first and second buffer memories 25, 28 respectively. The control circuit 17 issues a writing instruction to drive the disk recorder 14. When the disk recorder 14 is rotated, signals denoting the index I and the starting position of the first read-write of the specified track are read out. At this time, the counter 31 makes a count corresponding to the sequential order of a track scanned by the magnetic head. When a track specified by the CPU 18 is scanned by the magnetic head, the third coincidence detector 32 produces a coincidence signal. Where the starting position SP of the first read-write of a specified track is detected, while said specified track is being scanned by the magnetic head, then a coincidence signal is issued from the coincidence detector 24 which compares a count made by the first counter 23 and a data stored in the first buffer memory 25. This coincidence signal resets the second counter 26. The second counter 26 freshly counts a number of sector positions SP as measured from the starting the first read-write of a specified track, thereby determining the sequential order of a specified sector of said specified track. Where coincidence takes place between the sequential order of said specified sector and a data supplied from the CPU 18 to the second buffer memory 28 which denotes the sequential order of said specified sector, then the second coincidence detector 29 generates a coincidence signal. Upon receipt of a sector coincidence signal from the second coincidence detector 29 and a track coincidence signal from the coincidence detector 32, the AND circuit 30 sends forth an output. This output opens one gate of the AND circuit 21 which is supplied with a writing instruction delivered from the control circuit 17. A write data read out of the buffer memory 19 is written in a specified sector of a specified track of the disk recorder 14 through the data bus 20 and AND circuit 21, thus, writing is carried out in a sector having a sequential order specified by the CPU 18 at the starting position SP of the first read-write which is defined for each track.

Reading of data out of the disk recorder 14 is effected by causing the control circuit 17 to give a reading instruction and supplying the first and second buffer memories 25, 28 with signals denoting the sequential order of a track specified for reading and the sequential order of a specified sector of said specified track. Data read out of the disk recorder 14 is stored in the buffer memory 19 through the AND circuit 22 and data bus 20.

Figure 4:
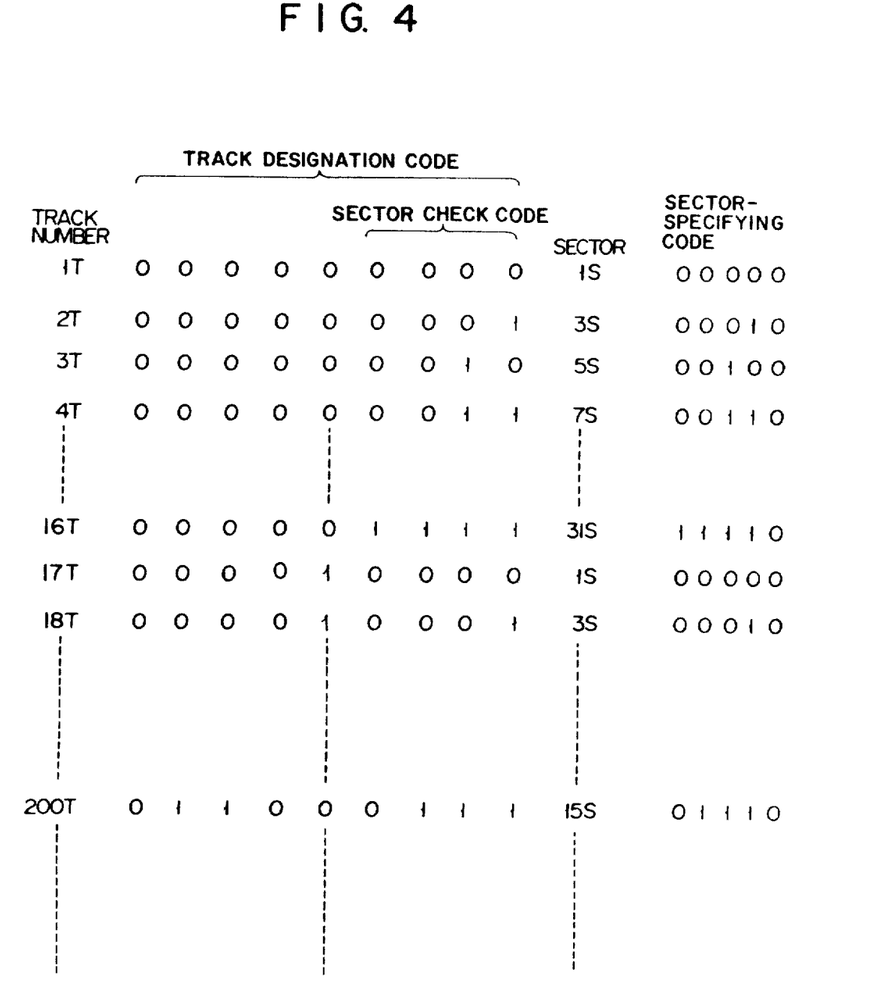
FIG. 4 is a relative relation between a track designation code configuration and a sector check code configuration as used in another embodiment of this invention.

The foregoing description refers to the case where the magnetic head was shifted from a given track to the adjacent one in a shorter time than that which was required for the disk recorder 14 to be rotated through one circumferential angular interval corresponding to one sector of said given track. Where, however, the disk recorder 14 is rotated through a circumferential angular interval corresponding to more than one sector but less than two sectors of a track and further keeps on rotating, beyond the starting position SP of the first read-write of a given track, then it is advised to delay the time required for the starting position SP of the first read-write of said given track to reach the magnetic head by a length of time which the disk recorder 14 takes for rotation through two sectors. With the first track 1T, sector 1S is taken as the position in which the first read-write of the first track 1T is to be commenced. The sector 3S is taken as the position in which the track position of the second track 2T is to be commenced. The sector 5S is taken as the position in which the track position of the third track 3T is to be commenced. FIG. 4 shows 9-bit codes denoting specified tracks and 5-bit sector-positioning codes representing the specified sectors of said specified tracks. The specified sectors 1S, 3S, 5S . . . of the respective tracks 1T, 2T, 3T . . . are formed of 5-bit codes. The respective sequential orders 1S, 3S, 5S, 7S . . . of the specified sectors are denoted respectively by a 5-bit code of 00000, 00010, 00100 . . . . Where coincidence is obtained between the last four bits of the track-specifying codes and the first four bits of the representing the sector-specifying codes, then it is possible to confirm the sequential orders of the specified tracks and the track starting position of said specified tracks.

Figures 5, 7:
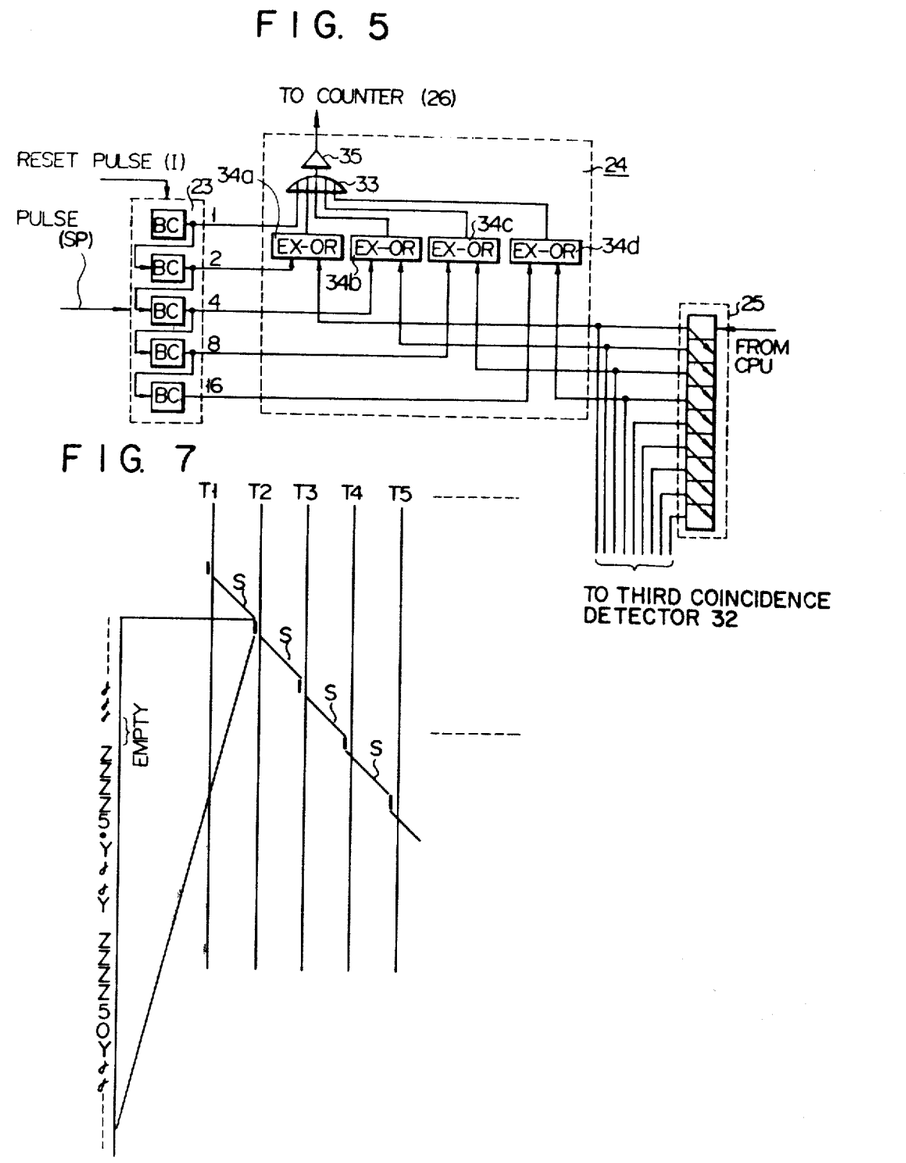
FIG. 5 is a detailed circuit arrangement showing the block diagram in FIG. 2.
FIG. 7 shows a schematic view showing a data storage state on a plurality of tracks on a magnetic recording medium.

According to the data-recording device of this invention shown in FIG. 2, the first coincidence detector 24 detects coincidence between the first four bits of a 5-bit count made by the first counter 23 and the last four bits of a 9-bit track-specifying data read out of the first buffer memory 25 and produces a coincidence signal, provided the lowermost bit of a count made by the first counter 23 is 0. Namely, the data-recording device of this invention shown in FIG. 2 should advisably have such an arrangement as indicated in FIG. 5, where the disk recorder 14 is rotated through a circumferential angular interval corresponding to more than one sector but less than two sectors. Referring to FIG. 5, the first counter 23 is formed of five binary counters BC arranged in series, and supplied with a signal showing the detection of the index I as a reset pulse and also with a signal showing the detection of the starting position SP of the first read-write as a count-advancing pulse. Further, the first counter 23 is so designed as to issue a count signal formed of five parallel bits. The first buffer memory 25 comprises nine memory elements for storing a 9-bit coded data deliverd from the CPU 18. The nine bits constituting said data are read out of the nine memory elements in parallel.

The coincidence detector 25 comprises an inverter 35, OR circuit 33 and four exclusive AND circuits 34a and 34d. The first four bits of a count signal supplied form the first counter 23 are supplied to the four exclusive AND circuits 34a to 34d respectively. The last four bits of a data read out of the buffer memory 25 are also conducted to said AND circuits 34a to 34d in the same order as the above-mentioned first four bits. Where coincidence takes place between the above-mentioned first and last groups of four bits, then the exclusive AND circuits 34a to 34d all produce an output having a logic level of "0". Output signals from the exclusive AND circuits 34a to 34d and the lowermost bit of a count signal supplied from the first counter 23 are carried to the OR circuit 33, an output from which is transmitted to the inverter 35. Where the lowermost bit of a count signal read out of the first counter 23 is "0" and the first four bits of said count signal coincide with the last four bits of a track data, then the first coincidence detector 24 issues a coincidence signal.

Where the first coincidence signal 24 of FIG. 2 has such an arrangement as shown in FIG. 5, then it is possible to write data in the disk recorder 14 or read it out therefrom in such a manner that the point of time at which the starting position of the first read-write of a given track reaches the magnetic head is delayed by a length of time required for the disk recorder 14 to be rotated through a circumferential angular interval corresponding to two sectors, each time the magnetic head is shifted from said given track to the adjacent one.

Where it is necessary to delay the point of time at which the starting position of the first read-write of a given track reaches a magnetic head by a length of time required for the disk recorder 14 to be rotated through a circumferential angular interval corresponding to three or more sectors, each time the magnetic head is shifted from said given track to the adjacent one, then the coincidence detector 24 of FIG. 5 is also applicable with required modifications.

The foregoing description refers to the embodiment wherein a plurality of tracks provided in a magnetic disk are each separated into a plurality of divisions or sectors by the index and the plurality of sector-starting positions SP, and the starting positions of the first read-write of the respective tracks are set at the index position and the specified ones of said sector-starting positions. In some cases, however, each track of the magnetic disk is provided with a mark off position at which the first read-write is to be commenced, and further, if necessary, with check data for indicating the form of data stored in the track, thereby controlling the writing of data in the track and reading it out therefrom. Where the common item is read out of a plurality of tracks by means of a magnetic head, it is tried to find whether a given track contains an index data for the common item by one full rotation of said track. Where absence of the index data is confirmed the magnetic head is immediately shifted to each succeeding track, without taking the trouble of reading out all the data stored in aid index-free track, thereby enabling the required data to be read out of a plurality of tracks without wasting time.

There will now be described by reference to FIGS. 6 to 11 a data-recording device according to another embodiment of this invention. This embodiment enables the magnetic head to seek the starting position of a sector preceded by an index without wasting time while being shifted from one track to another FIG. 6 only shows the first and second tracks T1, T2 of a rotatable magnetic recording medium, for example, a mangetic disk. An index I1 is bored at a given point on the first track T1. An initial data ID for indicating the commencement of data reading is written behind a small blank space provided after the index I1. The initial data ID is formed of three consecutive character codes each represented by a 4-bit code of "0000". Reading of three "0"-bit codes corresponding to three characters shows the presence of the initial data ID. A track head TH is written behind the initial data ID. The track head TH is formed of a combination of coded numerical data, whose foremost bit is represented by "1". According to the embodiment of FIG. 6, the track head is formed of two digits, for example, "5". . Each of the three 4-bit initial codes constituting the initial data ID consists of a series of "0" bits as previously described. Other data are formed of code arrangements shown in the following table.

Figure 6:
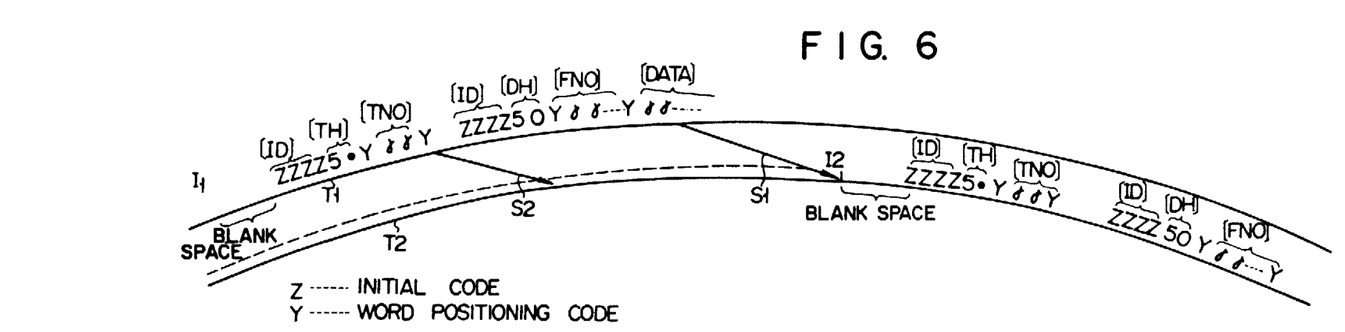
FIG. 6 shows a data storage state as in another embodiment of this invention.

| Data | Code Arrangement 4-bit code |
|---|---|
| 0 | 1111 |
| 1 | 1110 |
| 2 | 1101 |
| 3 | 1100 |
| 4 | 1011 |
| 5 | 1010 |
| . | . |
| . | . |
| . | . |
| 9 | 0110 |
| •(dot) | 0101 |
| . | . |
| . | . |
| . | . |
| Initial code | 0000 |

A data TNO showing the sequential order of, for example, the first track T1 is written immediately behind the track head TH. The initial data ID, track head TH and track number TNO jointly represented a first check data.

A second initial data ID having the same code arrangement of ZZZ as described above is written after the first index I1. Written after said second initial data ID is a data head DH showing that concrete data follows said data head DH. This data head DH is formed of a combination of a plurality of coded numerical data, for example, "50", whose foremost bit indicates "1". A file number FNO showing the content of each item included in concrete data is written after the data head DH. Written after the file number FNO is the content of each item. The aforesaid second initial data ID, data head DH and file number FNO jointly constitute a second check data.

With the second track T2, too, an index I2, the starting position of the first read-write of said second track T2, is followed by first and second check data. The index I2 is positioned at a point corresponding to a prescribed circumferential angular interval through which the disk recorder 14 is rotated from the index I1 of the first track T1 in the specified direction. Now let it be assumed that a magnetic head is shifted, upon receipt of a seek instruction to the second track T2 in a direction indicated by an arrow S1 shown in FIG. 6. Then, the second index I2 is set at a point facing the foremost end of said arrow S1. After the second check data written in the first track T1 is read out, a seek instruction is given. As the result, the magnetic head is shifted to the second track T2 to scan its surface. The initial data ID forming the foremost part of the first check data and the following data are read out in succession. Later, the starting position of the first read-write is brought to that point on each succeeding track which corresponds to a circumferential angular interval through which the disk recorder 14 is rotated while the magnetic head is shifted from one track to another.

Where the disk recorder 14 has a plurality of tracks T1, T2, T3, T4, T5 . . . shown in FIG. 7, the magnetic head is shifted along the line indicated by S. The initial data ID and folllowing check data of each track are read out. A coincidence detector detects whether the check data thus read out represents a common check data to a plurality of data item being read out of the tracks. If the check data thus read out is not the required common check data, then the magnetic head is immediately shifted to another track adjacent to the preceding track which does not contain the desired common check data, without taking the trouble of searching for said common check data throughout said preceding track, in order to find out the desired common check data in said another track.

Figure 8:
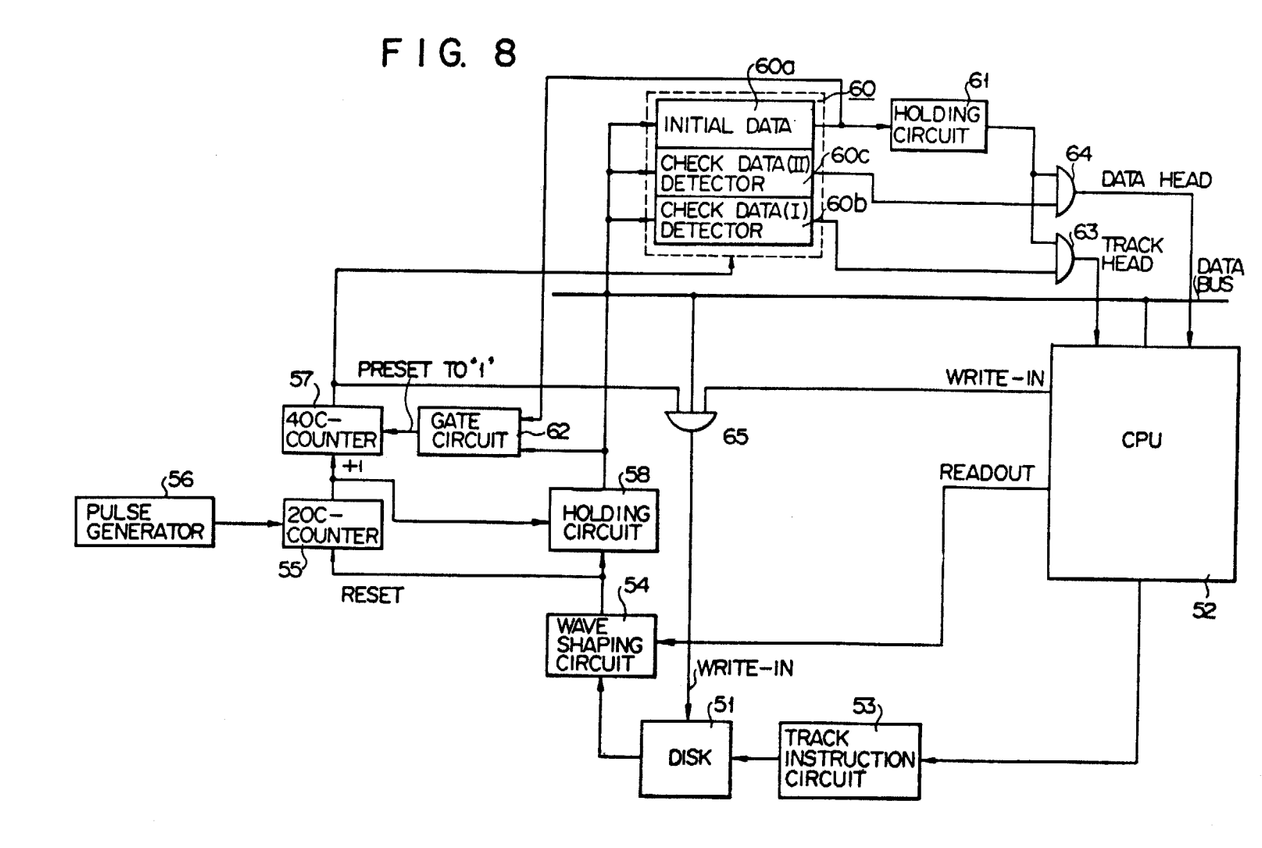
FIG. 8 is a block circuit diagram, corresponding to another embodiment of this invention, which is adapted to control data write-in and readout operation.

FIG. 8 is a block circuit diagram of a device for carrying out the above-mentioned reading and writing of data. A magnetic disk 51 is controlled by an instruction issued from a central processing unit (CPU) 52. A track-specifying circuit 53 designates a track in which data is to be written or out of which data is to be read. Data read out of the magnetic disk 51 is supplied to a waveform shaper 54. Where, upon receipt of a reading instruction from the CPU 52, a data represented by a logical code of "1" showing the presence of a significant signal is read out of the magnetic disk 51, then said data is conducted to the waveform shaper 54, which in turn produces an output signal shaped into, for example, a rectangular waveform. The above mentioned data represented by a logical code of "1" which has been read out of the waveform shaper 54 is supplied as a reset instruction to a counter 55. This counter 55 counts clock pulses issued from a clock pulse oscillator 56, for example, a quartz oscillator which generates stable standard clock pulses. Each time an output of "1" is sent forth by the waveform shaper 54, the above-mentioned reset signal is used as a synchronizing signal for clock pulses issued from the clock pulse oscillator 56. Now let it be assumed that a time interval between the respective bits constituting stored data corresponds to a length of time required for the clock pulse oscillator 56 to issue 20 clock pulses. The 20-scale counter 55 sends forth an output corresponding to an interbit time interval as a synchronizing signal to a character counter 57 per counting cycle, that is each time, for example, "9" included in the "20" scale is repeatedly counted. The character counter 57 counts a number of bit outputs supplied from the 20-scale counter 55. The character counter 57 is of a 4-scale type, where one character data read out of the disk recorder 51 is formed of four bits. Output signals successively delivered from the waveform shaper 54 are held one after another in a holding circuit 58 each time the 20-scale counter 55 issues a bit-synchronizing signal represented by, for example, the above-mentioned count "9". An output from the holding circuit 58 is conducted to a data bus 59 and also to an initial data detector 60a a first check data detector 60b for detecting a track head and a second check data detector 60c for detecting a data head, all constituting a data-detecting circuit 60.

An output detection signal from the initial data detector 60a is held in the holding circuit 61 and thereafter supplied to a gate circuit 62 together with an output from the holding circuit 54. Both signals are supplied to the 4-scale character counter 57 as a reset instruction signal to define an initial numeral from which the 4-scale character counter 57 commences digit counting, in order to effect the synchronization of said digit counting. While the digit counting of the 4-scale character counter 57 is being synchronized, output count signals from the 4-scale character counter 57 are read out in parallel as counts indicating bits constituting a character. A count signal issued from the 4-scale character counter 57 which represents the last digit of said 4-scale is supplied to the data-detecting circuit 60 as a signal for controlling the detector of a character data read out of the disk recorder 51.

An output from the holding circuit 61 is delivered as a gate signal to one gate of an AND circuit 63, the other gate of which is supplied with an output from the detector 60b of the first check data I. An output from the AND circuit 63 is transmitted as a track head data to the CPU 52, and also as a gate signal to one gate of an AND circuit 64 the other gate of which is supplied with an output from the detector 60c of the second check data II. An output from the AND circuit 64 is sent forth as a signal denoting the data head to the CPU 52.

Data being written in the disk recorder 51 is transferred through the data bus 59 and AND circuit 65. A writing instruction from the CPU 52 and count signals from the 4-scale character counter 57 are supplied as gate signals to the gates of an AND circuit 65. When the gates of said AND circuit 65 are opened, the count signals from the 4-scale character counter 57 are supplied to the disk recorder 51.

Figure 9:
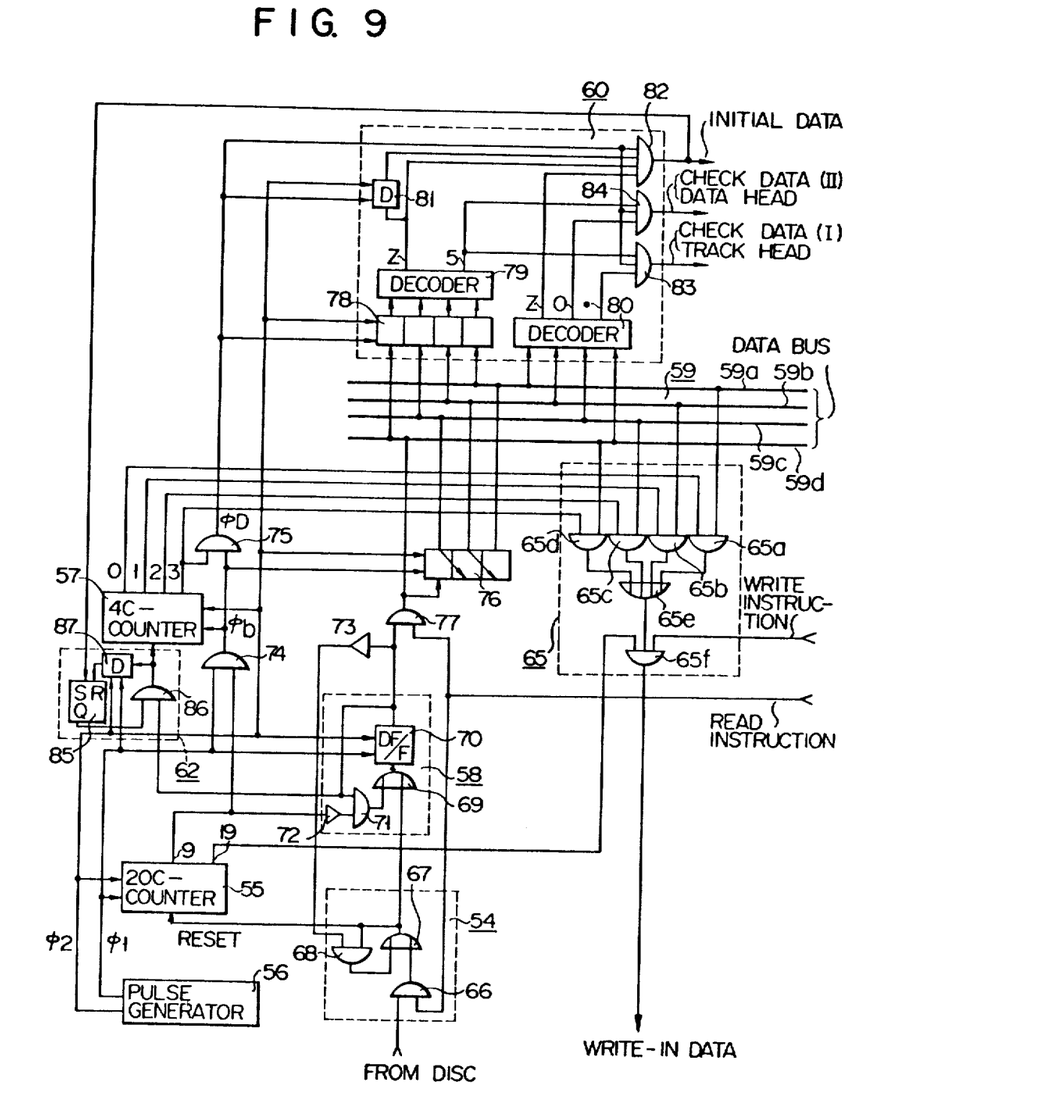
FIG. 9 is a detailed circuit diagram corresponding to the embodiment in FIG. 8.

FIG. 9 is a more concrete representation of the above-mentioned data-recording device. The waveform shaper 54 comprises an AND circuit 66 supplied with data read out of the disk recorder 51, OR circuit 67 for drawing out an output from said AND circuit 66 and AND circuit 68 for feeding back an output from said OR circuit 67. A reading instruction from the CPU 52 is supplied as a gate signal to one gate of the AND circuit 66.

The holding circuit 58 comprises an OR circuit 69 supplied with an output from the OR circuit 67 included in the waveform shaper 54; a delay circuit 70 formed of a delayed flip-flop circuit supplied with an output from the OR circuit 69 and operated by clock pulses $\phi 1$, $\phi 2$ issued from the clock pulse oscillator 56; an AND circuit 71 for feeding an output from the delay circuit 70 back to the CR circuit 69; and an inverter 72 connected to one gate of the AND circuit 71 and supplied with an output from the counter 55 when it repeatedly counts, for example, "9" included in the 20-scale. Outputs from the waveform shaper 54 are supplied one after another to the holding circuit 58, each time the counter 55 counts "9". The gates of the AND circuit 68 are opened or closed according to an output from the inverter 73 connected to the output terminal of the delay circuit 70. When data of "1" is read out of the disk recorder 51 while data of "0" is held in the holding circuit 58, then the waveform shaper 54 latches said data of "1". Under this condition, data of "1" is supplied to the holding circuit 58.

An output from the counter 55 which denotes a count "9" is supplied to the holding circuit as a synchronizing signal when bit data is read out of the disk recorder 51. The "9" output from the counter 55 is also transmitted to an AND circuit 74 together with a clock pulse $\phi 1$ issued from the clock pulse oscillator. An output from the AND circuit 74 is used as a bit synchronizing pulse $\phi b$. This synchronizing pulse $\phi b$ from the AND circuit 74 is supplied as a counting instruction to the 4-scale counter 57 and also sent forth to an AND circuit 75 together with an output denoting the count "3" constituting the last digit of the 4-scale of the counter 57. As a result, the AND circuit 75 produces a digit pulse $\phi D$ for reading out a character of 4-bit arrangement. A bit-synchronizing pulse $\phi b$ delivered from the AND circuit 74 is supplied, together with a clock pulse $\phi 2$, as an instruction for shifting data stored in a memory section 76 consisting of three 1-bit memory elements arranged in series.

The first memory element of the memory section 76 is supplied with data stored in the holding circuit 58 through an AND circuit 77 whose gates are opened by a reading instruction. An output from the holding circuit 58 and outputs from the three memory elements of the memory section 76 are transferred to lines 59a to 59d constituting the data bus 59 respectively. Outputs are read out in parallel from said lines 59a to 59d to provide a 4-bit character.

Signals transferred to the four lines 59a to 59d of the data bus 59 and read out of the holding circuit 58 and memory section 76 are supplied to the memory section 78 of the data detecting circuit 60. The memory section 78 comprises four 1-bit memory elements corresponding to the above-mentioned four lines 59a to 59d. The memory section 78 is operated by a clock pulse $\phi 2$ issued from the clock pulse oscillator 56 as well as by an output from the 4-scale counter 57 which denotes the last digit of the 4-scale, that is, a clock pulse $\phi D$ issued for each character. Thus, data transferred to the data bus 59 is detected by a decoder 79 at a time delayed by a length of time required for one character to be read out. Data supplied to the data bus 59 is detected by a decoder 80. The former decoder 79 detects data "Z(0000)" constituting an initial code and a numeral "5(1010)". The latter decoder 80 detects an initial code "Z(0000)", a numeral "0(1111)", and a point "•(0101)". An output signal from the decoder 79 which shows the detection of the initial code Z is supplied to a delay circuit 81 operated by the clock pulse $\phi D$ and clock pulse $\phi 2$. An output from said delay circuit 81 is conducted to one gate of an AND gate 82, which concurrently acts as a circuit for detecting the initial data Z. Where the other gates of the AND circuit 82 simultaneously receive a synchronizing pulse $\phi K$ for reading a character from the AND circuit 75, and initial codes Z from the decoder 79, 80, namely, where initial codes corresponding to three characters are produced, then an initial data is issued from the AND circuit 82. When the gates of an AND circuit 83 receive a data on a numeral "5" from the decoder 79 and a data on a point "•" from the decoder 80 and also the synchronizing pulse $\phi K$, then the AND circuit 83 sends forth an output regarding the first check data denoting the track head of "5•". When the gates of an AND circuit 84 receive a data on a numeral "5" from the decoder 79 and a data on a numeral "0" and also the synchronizing pulse $\phi K$, then the AND circuit 84 generates an output regarding the second check data denoting the data head of "50". The AND circuits 82, 83, 84 concurrently act as the aforesaid data detectors 60a, 60b, 60c of FIG. 8.

"Write" data transferred through the data bus 59 is read out through the AND circuits 65a to 65d connected to the lines 59a to 59d of the data bus 59 respectively, and then supplied to an AND circuit 65f through an OR circuit 65e. The gate of the AND circuit 65a is opened by a signal denoting the first digit "0" of a four-scale data read out of the four-scale character counter 57 and is kept closed in the absence of said "0" signal. Similarly, the gates of the AND circuits 65b, 65c, 65d are opened or closed upon receipt of or in the absence of the second, third and fourth digits "1", "2" and "3" respectively of said four-scale data of the four-scale character counter 57. As the result, bit data supplied in parallel to the lines 59a to 59d of the data bus 59 are now read out in the form of series. The gate of the AND circuit 65f as opened upon receipt of an output from the counter 55 which denotes a numeral of, for exaple, "19". Each time 20 clock pulses from the clock pulse oscillator 56 are counted, the AND circuit 65f sends forth "write" data to the disk recorder 51 while the reading of data bits is synchronized.

The gate circuit 62 for sending forth a presetting instruction to cause the four-scale counter 57 subsequently to start counting from "1" comprises a flip-flop circuit 85 which is reset by an output from the AND circuit 82 of the initial data detector which denotes the detection of an initial data, an AND circuit 86, one gate of which is opened when the flip-flop circuit 85 is set and the other gate of which is supplied with an output from the holding circuit 58 and which supplies the four-scale counter 57 with an instruction to cause said counter 57 subsequently to start counting from "1", and a delay circuit 87 which is operated by clock pulses $\phi 1$, $\phi 2$ and which delays an output from the AND circuit 86 by a length of time required for an initial data to be read out and supplies said delayed output as a reset signal to the flip-flop circuit 85 and causes the four-scale counter 57 to commence a synchronous counting upon receipt of a signal instructing of the reading of the digit "1" following the initial data.

There will now be described the writing of data in the disk of the data-recording device of this invention arranged as described above. The 20-scale counter 55 counts clock pulses just as issued from the clock pulse oscillator 56 without specifying any digit of the 20-scale as the starting point of counting. The 20-scale counter 55 generates an output, each time "9" and "19" are counted. A "9" output from said counter 55 is supplied at an interval of one bit to the 4-scale character counter 57 through the AND circuit 74 as an instruction for upcounting of "+1". Thus, a number of bits is counted for each character, while the reading of bits is synchronized. Where, under this condition, a writing instruction is issued and data bit signals are transferred in parallel through the lines 59a to 59d of the data bus 59, then said data bit signals are converted into series-arranged data bit signals by passing through the AND circuits 65a to 65d and OR circuit 65e.

Where an "19" output from the 20-scale counter 55 is supplied to the gate of the AND circuit 65f, then the AND circuit 65f sends forth "write" data to the disk recorder 51 with the reading of bits synchronized. The disk recorder 51 detects a data on the sequential order of a specified track which follows the initial data, and delivers concrete data following the data head to the data bus 59.

Desired data stored in the disk of the disk recorder 51 is read out through the process of causing the CPU 52 to generate a track-specifying output, defining the sequential order of the specified track by the track-specifying circuit 53 and controlling the operation of the disk recorder 51 by said sequential order signal. Where the disk recorder 51 is thus operated and the CPU 52 issues a reading instruction, then a magnetic head scans the surface of the specified track. The detection of the initial data leads to the synchronization state and, by reading out the first data "1" from the disk, synchronization is achieved to permit data readout. Each time "1" data is read out of the disk, the waveform shaper 54 produces an output to reset the 20-scale counter 55 thereby effecting the synchronization of bit reading. An output from the waveform shaper 54 is conducted to the data bus 59 through the holding circuit 58 and AND circuit 77. Under this condition, however, the data detecting circuit 60 does not send forth an output to the CPU 52. At this time, data is not yet read out because no preparation is made for said reading. Where the index I stored in a given track of the disk recorder 51 passes through a point on the track facing a magnetic head and a blank space on the track in which no data is stored and a coded signal (0000) is read out as an initial data corresponding to three characters, then reading of data bits from the holding circuit 58 is synchronized by a bit-synchronizing signal from the counter 55. Thereafter, a coded signal (0000) corresponding to the first character of the initial data is conducted through the AND gate 77 to the data bus 59 and memory section 76. Data read out of the memory section 76 upon receipt of a clock pulse $\phi 2$ from the clock pulse oscillator 56 is carried through the data bus lines 59a to 59d and supplied to the decoder 80 of the data-detecting circuit 60 together with an output from the data bus 59. A signal (0000) corresponding to the first of the three characters ZZZ is delivered to one of the gates of the AND circuit 82. An initial data signal (0000) corresponding to the second character Z undergoes the same processing as described above after leaving the disk and passes through the data bus 59 to the memory section 78 of the data detecting circuit 60. Upon receipt of a clock pulse $\phi 2$ from the clock pulse oscillator 56, a stored initial data signal (0000) corresponding to the second character Z is read out to the decoder 79 and is transmitted to the other gate of the AND circuit 82 after being delayed from the initial coded signal corresponding to the first character Z by a length of time required for one character to be read out. An initial data signal (0000) corresponding to the last character Z is read out of the decoder 79 through the same process as mentioned above and supplied to the other gate of the AND circuit 82 through the delay circuit 81 after being delayed from an initial data signal corresponding to the immediately preceding character Z by a length of time required for one character to be read out. Thus, initial data signals (0000), (0000) (0000) corresponding to the three characters Z, Z, Z are sent forth from the AND circuit 82 upon receipt of the last synchronizing pulse $\phi D$ from the AND circuit 75. An output from the AND circuit 82 which shows the detection of the above-mentioned initial data signals is supplied as a set signal to the flip-flop circuit 85 included in the gate circuit 62.

When the flip-flop circuit 85 is set, then the gate of the AND circuit is opened. Thus, the character counter 57 is brought into a position waiting for the reading of all the bits constituting one character to be synchronized. Where, under this condition, the first check data "5•" is read out of the disk to indicate a track head, then the first bit "1" of a code representing said check data "5•" is supplied to the holding circuit 58 through the waveform shaper 54. When the gate of the AND circuit 86 is supplied with the "1" bit signal hold in the holding circuit 58, then the AND circuit 86 produces an output, which presets the four-scale counter 57 subsequently to commence counting from the digit "1". This process is intended to synchronize the reading of all the bits constituting one character. Later when a "1" bit is read out of the disk, the waveform shaper 54 generates an output. A signal showing the absence of an output which is read out of the disk is stored in the memory section 76. A track head and data head following the initial data are detected by the data-detecting circuit 60 while the reading of all the bits constituting one character is synchronized by the 4-scale character counter 57. Concrete data bits stored in the disk are read out in parallel from the data bus lines 59a to 59d. A signal from the decoder 79 which denotes "5" and a signal from the decoder 80 which denotes "0" are detected by the AND circuit 84 as a data head. A detection output from the AND circuit 84 is supplied to the CPU 52. Thus, reading of concrete data is commenced. While concrete data is read out of the disk with the reading of all the bits constituting one character synchronized, the CPU 52 is supplied with a signal denoting the file number of an item included in the stored data, thereby determining by said file number whether the item being read out is the desired item. Where noncoincidence takes place between the file number read out and the file number of the desired item, then a track-changing instruction is given to the track-specifying circuit 53 to search for the file number of the required item.

Figure 10:
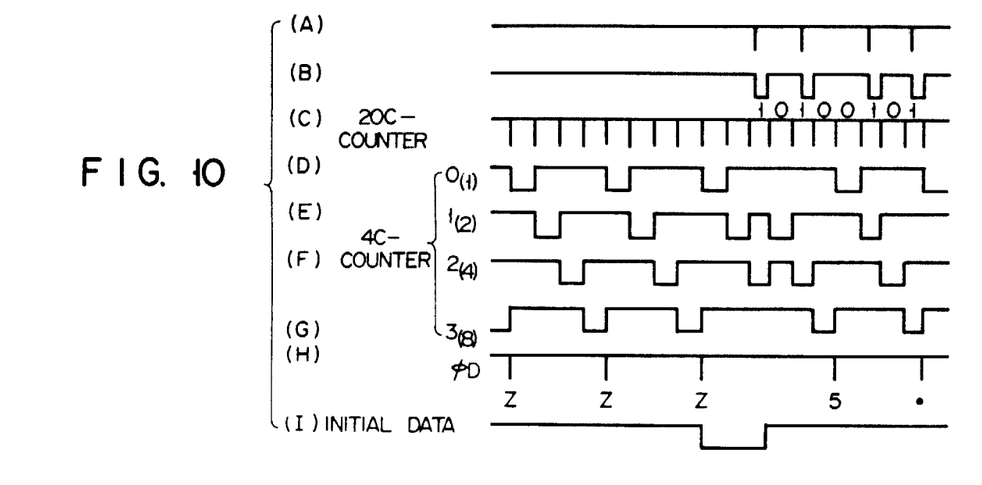

FIG. 10 is a detailed illustration of the waveforms of signals produced at various sections of FIG. 9. Now let it be assumed that the waveform shaper 54 and holding circuit 58 produce outputs having waveforms shown in FIGS. 10A and 10B respectively. Then the 20-scale counter 55 produces an output having a waveform shown in FIG. 10C when it counts "9". When counting "0" to "3", the 4-scale counter 57 sends forth outputs having waveforms shown in FIGS. 10D to 10G. Upon completion of each counting cycle, the 4-scale counter 57 generates a pulse $\phi D$ of FIG. 10H for synchronizing the reading of all the bits constituting one character. Upon receipt of said synchronizing pulse $\phi K$, initial codes are read out of the decoder 79 and delay circuit 81. When supplied with initial codes (0000), (0000), (0000) corresponding to three characters, the AND circuit 82 produces signals of FIG. 10I denoting the detection of said initial codes.

Figure 11:
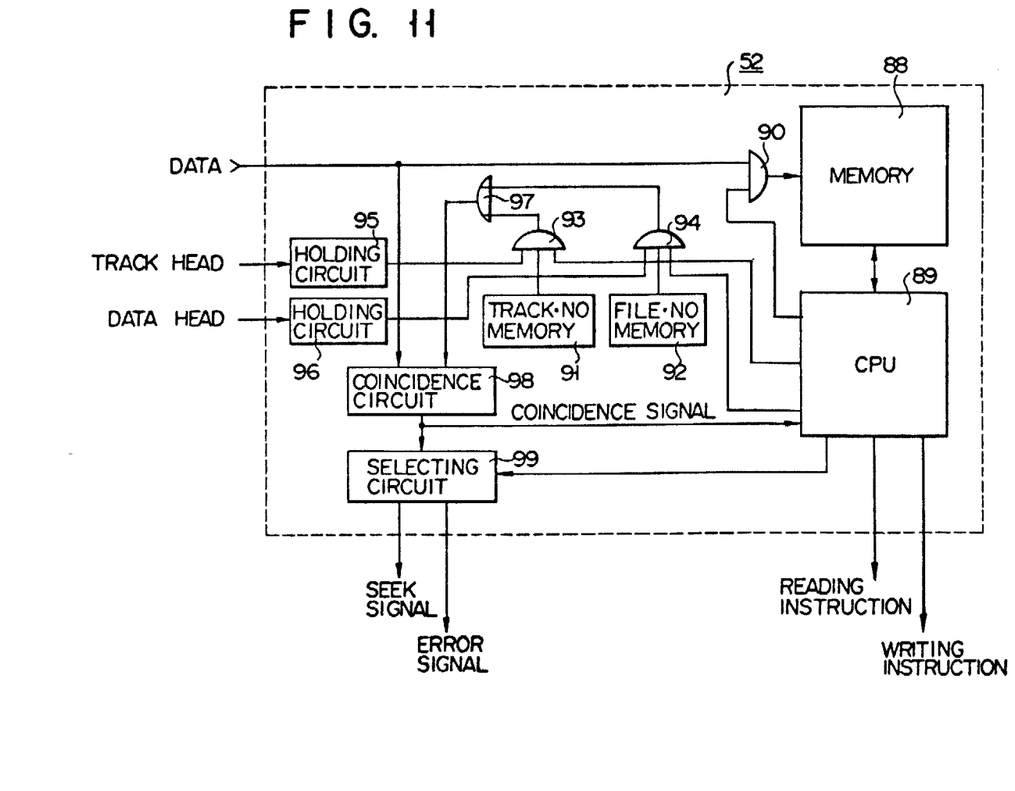
FIG. 11 is a detailed circuit diagram showing a data processing device in FIG. 8.

There will now be described by reference to FIG. 11 the operation of the CPU 52 which judges whether the content of data read out coincides with that of a specified data from a check data showing the sequential order of a given track read out and a file number representing a data head read out. Referring to FIG. 11, the CPU 52 comprises a memory device 88 and control type CPU 89. Data is stored in the memory device 88 through an AND circuit 90 whose gates are opened upon receipt of an instruction from the control type CPU 89. The CPU 52 is further provided with memory units 91, 92 for storing the sequential order of a track containing data and the file number of each item included in said data respectively. Signals denoting the sequential order of the track and the file number of each time are supplied to AND circuits 93, 94 respectively. The control type CPU 89 issues a gate signal to the gates of the AND circuits 93, 94. An output from a holding circuit 95 for holding an output from the data-detecting circuit 60 which denotes the detection of a track head and an output from a holding circuit 96 for holding a signal from said data-detecting circuit 60 which denotes the detection of a data head are delivered to the gates of the AND circuits 93, 94 respectively. Outputs from the AND circuits 93, 94 are supplied, together with concrete data, to a coincidence detector 98 through an OR circuit 97. In said coincidence detector 98, comparison is made between the track number TNO following the track head TH and the sequential order of a track stored in the memory 91 and also between the file numer PNO following the data head DH and the file number stored in the memory 92. Where noncoincidence appears as the result of these comparisons, then an instruction to change tracks is given to the disk recorder 51 through a selection circuit 99, and, if necessary, an error signal is sent forth to the disk recorder 51. Where the above-mentioned comparisons indicate coincidence, the control type CU 89 is supplied with a coincidence signal. Then the control type CPU 89 issues an instruction to the memory 88 to cause concrete data from the data bus 59 to be supplied to said memory 88 through the AND gate 90. The control type CPU 89 issues a writing instruction to the disk recorder 51 and a reading instruction to the waveform shaper 54.

The foregoing description refers to the embodiment where the magnetic head was shifted from one track to another by detecting the second check data. However, the magnetic head may be shifted as shown by the arrow S2 of FIG. 2, after the track number TNO is read out.

What is claimed is:

1. A data-recording device for substantially continuously reading and/or writing data on tracks of a magnetic disc recording medium, comprising:

a rotatable magnetic disc recording medium having a recording surface which has an index showing a rotation reference position and which has a plurality of adjacent concentric circular tracks to be scanned in predetermined order, each track having a starting position and a distinctive serial number, said recording medium comprising a plurality of sectors on said disc;

a single magnetic head disposed so as to face the recording surface of the rotatable magnetic disc recording medium and to scan the tracks thereof;

drive means for shifting the single magnetic head in the radial direction of the magnetic disc recording medium for scanning the tracks by the single magnetic head in said predetermined order;

a source of pulses having a predetermined repetition rate;

data writing means for writing a starting position data into each of the tracks at the respective starting position thereof which is spaced behind and from that of the immediately preceding track by a circumferential angular distance larger than that distance through which the rotatable magnetic disc recording medium is rotated during the time that the single magnetic head is shifted from one track to the next adjacent track, said data writing means including an electronic control means coupled to said source of pulses for counting the number of said pulses generated during the time that the single magnetic head is shifted from one track to the next adjacent track and for comparing the number of pulses counted with the serial number of each track, to thereby define said circumferential angular distance; and means for controlling the data writing to, and data reading from, each of the tracks, by detecting the starting position data written on each of the tracks.

* * * * *